United States Patent [19]

Bass et al.

[11] 4,276,814
[45] Jul. 7, 1981

[54] SAFETY LOCK FOR RAISING AND LOWERING MECHANISM

[75] Inventors: Merlyn D. Bass; Donald W. Demorest, both of Ottumwa, Iowa

[73] Assignee: Deere & Company, Moline, Ill.

[21] Appl. No.: 56,386

[22] Filed: Jul. 10, 1979

[51] Int. Cl.³ .......................................... F15B 15/26
[52] U.S. Cl. ............................................... 92/23
[58] Field of Search ............................ 92/18, 20, 23; 188/67 R

[56] References Cited

U.S. PATENT DOCUMENTS

| | | | |
|---|---|---|---|
| 2,258,825 | 10/1941 | Thompson | 92/23 |
| 2,512,150 | 6/1950 | Geren | 92/18 |
| 3,982,648 | 9/1976 | Luedtke | 92/23 |
| 4,039,093 | 8/1977 | Schmitz, Jr. | 92/23 |
| 4,073,345 | 2/1978 | Miller | 92/23 |
| 4,122,758 | 10/1978 | Bieringer | 92/23 |
| 4,187,624 | 2/1980 | Blau | 92/23 |

Primary Examiner—Abraham Hershkovitz

[57] ABSTRACT

A main frame carries a movable part for raising and lowering by means of a hydraulic cylinder, and a blocking member is selectively movable into a position between the piston rod end of the cylinder and a stop on the movable part for preventing accidental descent of the movable part.

6 Claims, 5 Drawing Figures

SAFETY LOCK FOR RAISING AND LOWERING MECHANISM

BACKGROUND OF THE INVENTION

A typical situation in which the present invention finds significant utility is that involving an agricultural machine having a main frame which carries a harvesting part or header for movement between raised and lowered positions. Conventionally, a hydraulic cylinder and piston unit is used as the force-exerting means, the cylinder and piston rod being connected respectively to the frame and header. During normal operation, the hydraulic unit is retracted to achieve the lowered or operating position of the header. During transport of the machine, or for purposes of repairs, etc., the header is raised by extension of the hydraulic unit. When the header is raised, it is desirable that some means be provided to prevent accidental descent of the header, which could cause serious injury to a mechanic working below the raised header. During transport, it is desirable that the hydraulic fluid be relieved of the duty of supporting the raised header.

SUMMARY OF THE INVENTION

According to a preferred embodiment of the present invention, a hydraulic cylinder is connected at its closed end to the main frame of an agricultural machine and the piston rod is connected to the header of the machine. A stop is provided on the header which, when the header is in its lowered position, lies closely alongside the cylinder and spaced from the piston rod end of the cylinder in the direction of the mounting of the cylinder on the main frame. When the header is raised, the stop, of course, moves with it and ultimately attains a position somewhat beyond the piston rod end of the cylinder. A blocking member is then interposed between the stop and said end of the cylinder so that the header cannot be lowered until the blocking member is removed. It is also a feature of the invention that the blocking member may be selectively interposed in and withdrawn from its blocking position. Also, locking means is provided to prevent accidental movement of the blocking member into and out of blocking position. The construction is simple, can be manufactured at small cost and is easy to operate.

DESCRIPTION OF THE PREFERRED EMBODIMENT

As will be appreciated, the invention is applicable to machines other than the type chosen for purposes of disclosure here. Also, the parts may be reversed from those illustrated, without sacrificing the benefits to be derived from the invention and its equivalents.

Figure 1:
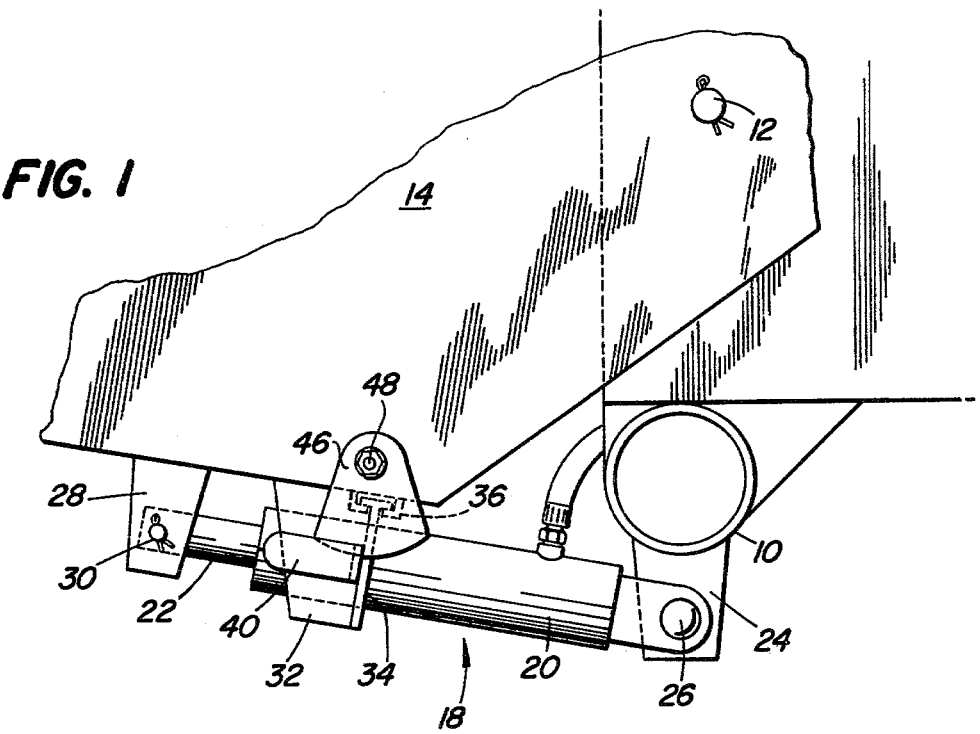
FIG. 1 is a fragmentary elevation of a representative machine having a main frame and a header, the header being shown in a lowered position.
Figure 2:
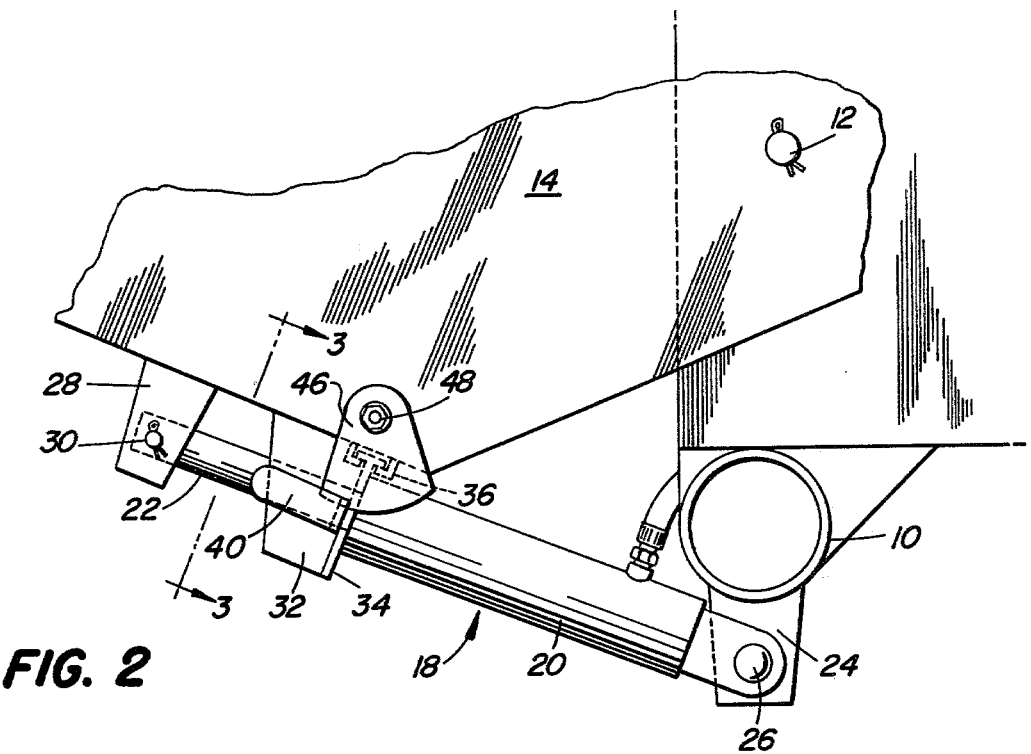
FIG. 2 shows the header in raised position.

FIGS. 1 and 2 show the main frame of a typical harvester 10 which has a transverse pivot 12 on which is mounted the rear end of a typical header 14. A fluid-operated or hydraulic unit 18 comprising a cylinder 20 and piston rod 22 is arranged between the fixed part (main frame 10) and the movable part (header) for raising and lowering the latter relative to the former. In a preferred design, a mounting ear or lug 24 is rigidly affixed to and depends from the main frame and is pivotally connected at 26 to the closed end of the cylinder. The header has a rigid depending lug or ear 28 pivotally connected at 30 to the free end of piston rod 22. Extension of the hydraulic unit 18 raises header 14 as the piston moves outwardly of the cylinder 20 upwardly and to the left as seen in the drawings. Retraction of the unit will, of course, cause descent of the header to its lowered position. If a one-way hydraulic unit is used, the descent of the header will be, of course, by gravity.

Figure 3:
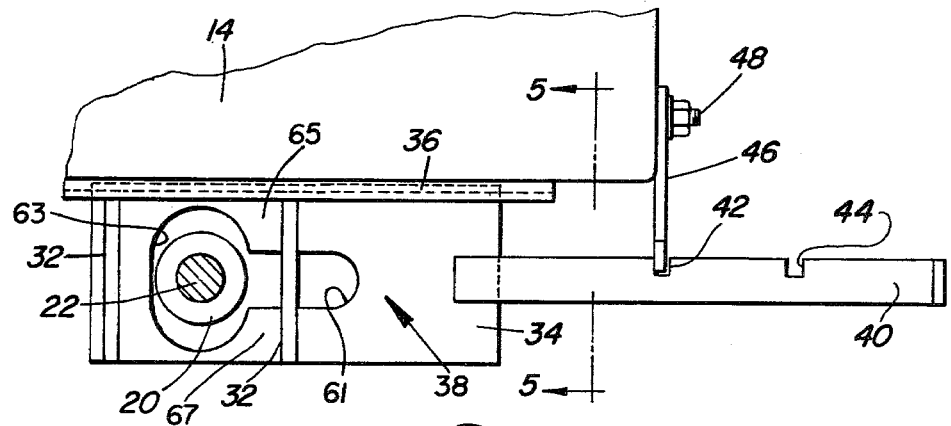
FIG. 3 is a view along the line 3—3 of FIG. 2, showing the blocking member in non-blocking position.
Figure 4:
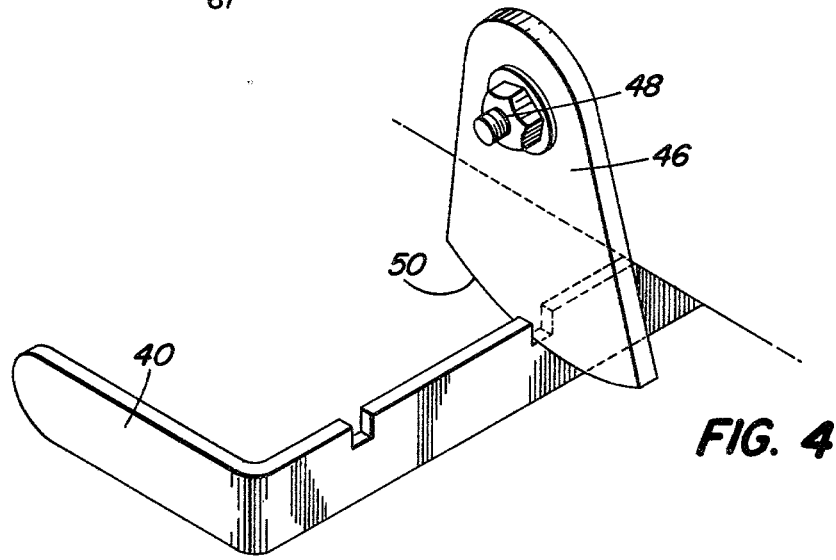
FIG. 4 is a fragmentary perspective showing the lock means.

Referring now to FIG. 3, the safety lock provided by the present invention includes a pair of laterally spaced stops 32 depending from the bottom of the header and rigidly secured thereto, preferably by welding (not shown). The spacing and positioning of stops 32 is such that the stops, together with the under portion of the header, form in effect a tunnel within which the cylinder lies. The positions of stops 32 as respects the length of the cylinder are best seen from a comparison of FIGS. 1 and 2. When header 14 is lowered (FIG. 1), the stops 32 lie closer to the closed end of the cylinder 20 and, as header 14 is raised, stops 32 of course move with it along the length of cylinder 20 until, in the fully raised position, stops 32 are slightly beyond the piston rod end of the cylinder (FIG. 2), leaving enough space, measured lengthwise as respects the cylinder 20 and piston unit 22, to enable the interposition of a blocking member 34 between stops 32 and the closed end of the cylinder.

Figure 5:
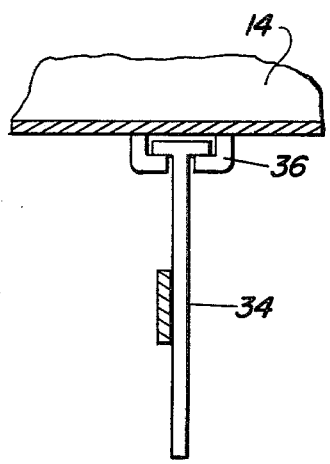
FIG. 5 is a section along the line 5—5 of FIG. 3.

A blocking member 34 is mounted for selective movement transversely of the cylinder into and out of blocking position, preferably being carried at its top edge by slide means 36 fixed to the under portion of the header (FIGS. 3 and 5). In order that the blocking member may traverse both stops, it has a slot 38 formed lengthwise therein. Slot 38 includes first and second slot portions 61, 63. The first slot portion 61 is defined by a pair of side walls 65, 67 extending transverse to hydraulic unit 18 and is dimensioned transverse to the length of the slot to be larger than the diameter of the piston rod 22 and smaller than the outer diameter of cylinder 20. The second slot portion 63 is defined by extensions of the pair of side walls and is sized to permit the outer diameter of cylinder 22 to be slid therethrough. Side walls 65, 67 together form a continuous outer wall for slot 38. FIG. 3 shows the unblocking position of blocking member 34 whereby the header may be freely raised and lowered with the sliding of cylinder 20 back and forth through slot 38, as for adjustment in field. The blocking position occurs when the member is moved fully to the left as seen in FIG. 3. In this position, rod 22 is inserted through slot portion 63 blocking movement of the header to the lowered position.

Convenient operation of blocking member 34 is attained by the provision of a handle 40 that is rigidly secured to member 34 and extends laterally outwardly as an extension of member 34 so as to be easily reached by a person standing alongside the machine. Handle 40 is formed at its upper edge with a pair of spaced notches 42 and 44, the spacing being according to the length of travel of the member 34 between its two positions. Means is provided for selectively locking the member 34 in either position, part of which means is afforded by the notches 42 and 44. Another part is a lock element 46 mounted on a transverse pivot 48 at the side of header 14 in such position as to engage either notch 42 or 44. The element is shaped with an arcuate bottom edge 50 related to the pivot 48 so that when the element and a notch are aligned, the element will swing by gravity into the notch and thus prevent movement of the blocking member until the element is manually moved out of the engaged notch. When member 34 is in blocking position, the lock prevents accidental movement of member 34. When the member 34 is withdrawn, for field operation of the machine, the lock engages the inner notch 42 and prevents accidental movement of the member into the path of the closed end of the cylinder.

What is claimed is:

1. In a machine having a fixed part, a movable part carried by the fixed part for raising and lowering relative to the fixed part, and a fluid-operated unit for selective raising and lowering of the movable part and including a cylinder connected at one end to the fixed part and a piston rod extending from the other end of the cylinder and connected to the movable part, the improvement comprising a stop fixed to the movable part closely alongside the cylinder and so positioned as to move beyond the piston rod end of the cylinder when the movable part is raised, a blocking member having a pair of side walls defining a slot extending generally transverse to said cylinder, said slot having a first portion with a first dimension larger than the diameter of said piston rod and smaller than the outer diameter of said cylinder, a tranverse slide mounting the blocking member on the movable part adjacent to the stop, said blocking member selectively movable in said slide between a blocking position with the side walls interposed between the stop and piston rod end the cylinder and with said rod inserted through said first slot portion and an unblocking position with the side walls and the first slot portion clear of the said end of the cylinder and said rod, and means for selectively moving the blocking member between its two positions.

2. The improvement according to claim 1, including means for selectively locking the blocking member in either of its positions.

3. The improvement according to claim 1, including a second stop similar to the first-mentioned stop and spaced laterally therefrom to receive the cylinder between them, and the blocking member, in its blocking position engages both stops as well as the piston rod end of the cylinder.

4. The improvement according to claim 1, in which the means for moving the blocking member includes a projecting handle aligned with and secured to the blocking member, said handle has a pair of notches spaced apart according to the blocking and unblocking positions of the member, and means is provided for selective engagement with the notches, said last-named means comprising an element carried by the movable part for movement into and out of a selected notch.

5. The improvement according to claim 4, in which the element is pivoted to the movable part in such fashion as to swing by gravity into a selected notch when the blocking member is moved by the handle to a position in which such notch becomes aligned with the element.

6. The improvement of claim 1 wherein said slot has a second portion sized to permit said piston rod and said cylinder to be slid therethrough when said blocking member is in said unblocking position and said movable part is lowered, said side walls of said blocking member form a continuous outer wall for said slot.

* * * * *